United States Patent
Tajima et al.

(10) Patent No.: US 8,338,064 B2
(45) Date of Patent: Dec. 25, 2012

(54) POLYCARBONATE RESIN COMPOSITION AND ELECTROPHOTOGRAPHIC PHOTOSENSITIVE BODY USING THE SAME

(75) Inventors: Jun Tajima, Ibaraki (JP); Takahiro Adachi, Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 717 days.

(21) Appl. No.: 12/309,682

(22) PCT Filed: Jul. 25, 2007

(86) PCT No.: PCT/JP2007/064543
§ 371 (c)(1),
(2), (4) Date: Oct. 28, 2009

(87) PCT Pub. No.: WO2008/013186
PCT Pub. Date: Jan. 31, 2008

(65) Prior Publication Data
US 2010/0047704 A1  Feb. 25, 2010

(30) Foreign Application Priority Data
Jul. 28, 2006 (JP) ................. 2006-205661

(51) Int. Cl.
*G03G 5/04* (2006.01)
(52) U.S. Cl. .......... 430/59.6; 430/69; 525/418; 525/453
(58) Field of Classification Search ................. 430/59.6, 430/69; 525/418, 453
See application file for complete search history.

(56) References Cited

U.S. PATENT DOCUMENTS
6,548,216 B2  4/2003  Kawamura et al.

FOREIGN PATENT DOCUMENTS
| JP | 10-301304 | 11/1998 |
| JP | 2000-178336 | 6/2000 |
| JP | 2002-202621 | 7/2002 |
| WO | 94/28458 | * 5/1994 |

OTHER PUBLICATIONS

International Search Report dated Sep. 11, 2007 in the International (PCT) Application PCT/JP2007/064543 of which the present application is the U.S. National Stage.

* cited by examiner

*Primary Examiner* — Thorl Chea
(74) *Attorney, Agent, or Firm* — Wenderoth, Lind & Ponack, L.L.P.

(57) ABSTRACT

A long-life electrophotographic photosensitive body having excellent wear resistance and crack resistance can be obtained by using a polycarbonate resin composition, which is obtained by blending 0.01-5 parts by weight of a silicone-modified polyurethane per 100 parts by weight of a polycarbonate resin, as a binder for photosensitive layer (or in case when the photosensitive layer is of multilayer type, for at least an electron transport layer) of the electrophotographic photosensitive body. The silicone-modified polyurethane is obtained by reacting a diol component (a) represented by the general formula (I) below, an active hydrogen-containing polysiloxane compound (b), a polyisocyanate component (c) and, if necessary, a chain extender (d). (In the formula (I), $R_1$ and $R_2$ independently represent a hydrogen atom or an alkyl group; $R_3$ represents a hydrogen atom, an alkyl group, an alkoxy group, a halogen atom or an alkoxycarbonyl group; M represents a single bond, a substituted or unsubstituted alkylene group or an oxyalkylene group; and n represents an integer of 0-4.

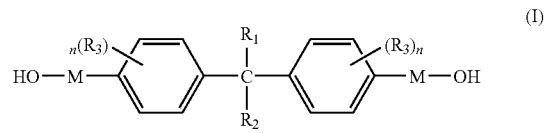

(I)

20 Claims, No Drawings

POLYCARBONATE RESIN COMPOSITION AND ELECTROPHOTOGRAPHIC PHOTOSENSITIVE BODY USING THE SAME

TECHNICAL FIELD

The present invention relates to a polycarbonate resin composition and an electrophotographic photosensitive body using the same. More precisely, the present invention relates to a polycarbonate resin composition comprising specific silicone-modified polyurethane and an electrophotographic photosensitive body using the same.

BACKGROUND ART

Currently, the electrophotographic technology is widely applied for copying machines, laser beam printers, fax machines or the like because of its high-speed processability, high image quality and so on.

As electrophotographic photosensitive bodies in the field of this electrophotographic technology, inorganic photoconductive substances such as selenium, selenium/tellurium alloys, selenium/arsenic alloys, cadmium sulfide or the like have mainly been used conventionally. However, recently an electrophotographic photosensitive body using an organic photoconductive substance has been developed from the viewpoint of toxicity, safety, cost, productivity and the like. When the organic photoconductive substance is a low-molecular weight substance, it is a general practice to mix it with a binder resin to form a coating film.

As the binder resin, various thermoplastic resins and thermosetting resins such as polymethylmethacrylate, polystyrene, vinyl polymers such as polyvinyl chloride and copolymers thereof, polycarbonate, polyester, polysulfon, phenoxyresins, epoxyresins and silicone resins have been used. Of these various resins, a polycarbonate resin shows relatively excellent characteristics and hence is used popularly.

Uses of various polycarbonate resins have been reported. For example, Patent Document 1 teaches to use a polycarbonate resin derived from 1,1-bis(4-hydroxyphenyl)cyclohexane and Patent Document 2 teaches to use a polycarbonate resin derived from 2,2-bis(4-hydroxyphenyl)propane, as a binder resin respectively.

Among the electrophotographic photosensitive bodies using these known organic photoconductive substances and various binder resins, ones comparable to an electrophotographic photosensitive body using an inorganic photoconductive substance in terms of sensitivity and so on are obtained.

These organic electrophotographic photosensitive bodies can be formed into a thin film with ease by means of a cast film-forming method and hence are suitable for mass production and the prices are relatively low. However, though having these excellent properties, the organic electrophotographic photosensitive body does not necessarily have satisfactory wear resistance, and hence an improvement is required.

For the purpose of improving wear resistance, several additives are proposed. For example, Patent Document 3 teaches silicone oil and an example of Patent Document 4 teaches perfluoroalkylacrylate.

In Patent Document 3, silicone oil compatible with a constituent material of the photosensitive layer of the electrophotographic photosensitive body is added by an amount exceeding the compatible limit with the constituent material of the photosensitive layer. Since an extremely large quantity of silicone oil is used, silicone oil is separated out within the layer. Therefore, there is a severe constraint between the size of a particle or a liquid droplet and the thickness of the layer to be added.

In Patent Document 4, perfluoroalkylacrylate is added at the time of forming a charge transport layer of the electrophotographic photosensitive body in Example 5. However, since 1 part of perfluoroalkylacrylate based upon 4 parts of a binder resin, which is a large amount, is added, there is a concern about keeping of transparency.

Patent Document 1: Jpn. Pat. Laid-Open Publication No. S60-172044
Patent Document 2: Jpn. Pat. Laid-Open Publication No. S63-170647
Patent Document 3: Jpn. Pat. Laid-Open Publication No. H10-171135
Patent Document 4: Jpn. Pat. Laid-Open Publication No. 2002-268241

DISCLOSURE OF THE INVENTION

Problems to be Solved by the Invention

The problem to be solved by the present invention is to solve the above-mentioned defects of conventional electrophotographic photosensitive bodies, and to provide a resin composition showing excellent wear resistance when it is used as a binder resin of an electrophotographic photosensitive body and an electrophotographic photosensitive body using the same.

Means for Solving the Problems

The inventors of the present invention paid intensive research efforts to dissolve the conventional problems and, as a result, they found that an electrophotographic photosensitive body wherein a polycarbonate resin composition blended with specific silicone-modified polyurethane is used as a binder resin shows low surface free energy and has excellent wear resistance, and thus completed the present invention.

Thus, the present invention relates to a polycarbonate resin composition and an electrophotographic photosensitive body using the same shown below.

1) A polycarbonate resin composition comprising (A) 100 parts by weight of a polycarbonate resin and (B) 0.01-5 parts by weight of silicone-modified polyurethane obtained by reacting a diol component (a) represented by the following general formula (I), an active hydrogen-containing polysiloxane compound (b), a polyisocyanate component (c) and, if necessary, a chain extender (d).

[Chemical Formula 1]

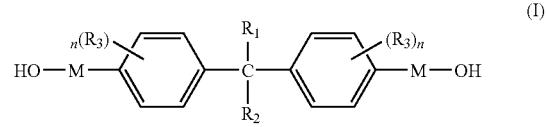

(I)

(In the formula (I), $R_1$ and $R_2$ independently represent a hydrogen atom or an alkyl group. $R_3$ represents a hydrogen atom, an alkyl group, an alkoxy group, a halogen atom or an alkoxycarbonyl group. "M" represents a single bond, a substituted or unsubstituted alkylene group or an oxyalkylene group. "n" represents an integer of 0 to 4.)

2) The polycarbonate resin composition according to claim 1, wherein said active hydrogen-containing polysiloxane compound (b) is a compound selected from the group consisting of active hydrogen-containing polysiloxane and a copolymer of active hydrogen-containing polysiloxane and caprolactone.

3) The polycarbonate resin composition according to claim 1, wherein the content of a siloxane component in said silicone-modified polyurethane is 5 to 80% by weight.

4) The polycarbonate resin composition according to claim 1, wherein said diol component (a) represented by the general formula (I) is 2,2-bis(4-hydroxyphenyl)propane or an alkyleneoxide adduct of 2,2-bis(4-hydroxyphenyl)propane.

5) The polycarbonate resin composition according to claim 1, wherein said polycarbonate resin is produced using at least one bisphenol selected from the group consisting of 1,1'-biphenyl-4,4'-diol, 2,2-bis(4-hydroxyphenyl)propane, 1,1-bis(4-hydroxyphenyl)cyclohexane and 2,2-bis(4-hydroxy-3-methylphenyl) propane as a starting material.

6) The polycarbonate resin composition according to claim 1, wherein the intrinsic viscosity of said polycarbonate resin is 1.0 to 1.6 dl/g.

7) The polycarbonate resin composition according to claim 1, characterized in that it is used as a binder resin for the photosensitive layer of an electrophotographic photosensitive body comprising at least a conductive support and a photosensitive layer.

8) The polycarbonate resin composition according to claim 1, characterized in that it is used as a binder resin for the charge transport layer of an electrophotographic photosensitive body comprising at least a conductive support and a multiple type photosensitive layer separated into a charge generating layer and a charge transport layer.

9) An electrophotographic photosensitive body comprising at least a conductive support and a photosensitive layer, wherein the polycarbonate resin composition according to any one of claims 1 to 6 is used as a binder resin for said photosensitive layer.

10) An electrophotographic photosensitive body comprising at least a conductive support and a multiple type photosensitive layer separated into a charge generating layer and a charge transport layer, wherein the polycarbonate resin composition according to any one of claims 1 to 6 is used as a binder resin for said charge transport layer.

Effects of the Invention

The polycarbonate resin composition of the present invention is a blend with specific silicone-modified polyurethane, and is a resin material excellent in wear resistance and crack resistance. Accordingly, by using the polycarbonate resin composition of the present invention as a binder resin for a photosensitive layer (or in case when the photosensitive layer is of multiple type, for a charge transport layer) of the electrophotographic photosensitive body, wear resistance of the electrophotographic photosensitive body can be improved while maintaining its electrification characteristic. Therefore, extendability of service life of a photosensitive body is expected.

BEST MODE FOR CARRYING OUT THE INVENTION

1. Polycarbonate Resin Composition

The polycarbonate resin composition of the present invention is a blend of a polycarbonate resin (A) with silicone-modified polyurethane (B).

(1) Polycarbonate Resin

The polycarbonate resin (A) to be used in the present invention is not particularly limited and various resins can be exemplified. Generally, an aromatic polycarbonate produced by reacting bisphenols with a carbonate precursor (a carbonate-forming compound) can be used.

Examples of bisphenols, though various compounds can be exemplified, include 4,4'-dihydroxybiphenyl, bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 1,1-bis(4-hydroxyhenyl)-1-phenylethane, bis(4-hydroxyphenyl)diphenylmethane, 2,2-bis(4-hydroxy-3-methylphenyl)propane, 1,1-bis(4-hydroxy-3-t-butylphenyl)propane, bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 4,4'-dihydroxyphenylether, 4,4'-dihydroxy-3,3'-dimethylphenylether, 4,4'-dihydroxyphenylsulfide, 4,4'-dihydroxy-3,3'-dimethyldiphenylsulfide, 4,4'-dihydroxydiphenylsulfoxide, 4,4'-dihydroxy-3,3'-dimethyldiphenylsulfoxide, 4,4'-dihydroxydiphenylsulfone, 4,4'-dihydroxy-3,3'-dimethyldiphenylsulfone, 9,9-bis(4-hydroxyphenyl)fluorene, 9,9-bis(4-hydroxy-3-methylphenyl)fluorene, and 9,9-bis(4-hydroxy-3-ethylphenyl)fluorene.

These phenols can be used each independently, or two or more than two of them can be used in combination with each other.

Among them, examples of the particularly preferable bisphenols include a compound selected from the group consisting of 2,2-bis(4-hydroxyphenyl)propane (bisphenol A; BPA), 1,1-bis(4-hydroxyphenyl)cyclohexane (bisphenol Z; BPZ) and 2,2-bis(4-hydroxy-3-methylphenyl)propane (bisphenol C; BPC).

In addition, a copolymer wherein two or more than two of these bisphenols are combined with each other such as a BPA/BPC copolymer is also preferable.

Examples of carbonate forming compounds include phosgenes such as phosgene or triphosgene and bisarylcarbonates such as diphenylcarbonate, di-p-tolylcarbonate, phenyl-p-tolylcarbonate, di-p-chlorophenylcarbonate, dinaphthylcarbonate and the like. Two or more of these compounds can be used in combination with each other.

The polycarbonate resin according to the present invention can be produced by a known method used for producing polycarbonate from the above-mentioned bisphenols and a carbonate precursor, for example, a direct reaction process of bisphenols and phosgene (a phosgene method) and an ester exchange reaction (a transesterification method) of bisphenols with diarylcarbonates (bisarylcarbonates).

According to the phosgene method, in general, the bisphenols are reacted with phosgene under the presence of an acid coupling agent and a solvent. Examples of acid coupling agents include pyridine and hydroxides of alkali metals such as sodium hydroxide, potassium hydroxide and the like. Examples of solvents include methylene chloride, chloroform, chlorobenzene and xylene.

In addition, for the purpose of accelerating the condensation polymerization reaction, it is preferable to add a catalyst such as a tertiary amine such as triethylamine or a quaternary ammonium salt into the reaction system. Moreover, it is also preferable to add monofunctional compounds such as phenol, p-t-butylphenol, p-cumylphenol, a long-chain alkyl-substituted phenol or the like as a molecular weight adjuster for adjusting the degree of polymerization. If desired, an antioxidant such as sodium sulfite or hydrosulfite and/or a branching agent such as fluoroglycin or isatin bisphenol can be added by a small amount.

Generally, it is proper to conduct the reaction in a temperature range between 0 and 150° C., preferably between 5 and 40° C. While the reaction time may vary depending on the reaction temperature, it is normally between 0.5 minutes and 10 hours, preferably between 1 minute and 2 hours. It is desirable to keep the pH of the reaction system not below 10 during the reaction.

According to the transesterification method, the bisphenols and bisarylcarbonate are mixed and reacted with each other at high temperature under reduced pressure.

The reaction is generally carried out in a temperature range between 150 and 350° C., preferably between 200 and 300° C. The ultimate pressure is preferably reduced to 1 mmHg or less to remove the phenols, which are derived from said bisarylcarbonate and are produced as a result of the transesterification reaction, from the reaction system by distillation.

While the reaction time varies depending on the reaction temperature and the reduced pressure level, it is generally 1 to 4 hours. The reaction is preferably carried out in an atmosphere of inert gas such as nitrogen or argon. If desired, the reaction may be carried out by adding a molecular weight adjuster, an antioxidant and/or a branching agent.

Of the phosgene method and the transesterification method, the phosgene method is more preferable in order to obtain an intended intrinsic viscosity.

Though the molecular weight of the polycarbonate resin thus obtained is not particularly limited, the intrinsic viscosity thereof is preferably 1.0 to 1.6 dl/g, more preferably 1.1 to 1.4 dl/g. When using the polycarbonate resin having the intrinsic viscosity within the above range as a binder resin for a photosensitive layer of an electrophotographic photosensitive body, a photosensitive layer film having sufficient crack resistance and film-forming properties can be obtained and hence an electrophotographic photosensitive body having a high durability can be obtained.

The polycarbonate resin having the intrinsic viscosity of above-mentioned range can be produced by a method, for example, controlling the amount of the molecular weight adjuster to be added. To be more precise, it can be obtained by adjusting the amount of the molecular weight adjuster to be added to be in the range of 0.6 to 1.2 mol % based upon the total amount of bisphenols.

(2) Silicone-Modified Polyurethane

Then, it is described about the silicone-modified polyurethane to be used as a component (B) of the present invention below.

The silicone-modified polyurethane is obtained by reacting a diol component (a), an active hydrogen-containing polysiloxane compound (b), a polyisocyanate component (c) and, if necessary, a chain extender (d).

(a) Diol Component

As the diol component (a), a compound represented by the following general formula (I) is used.

[Chemical Formula 2]

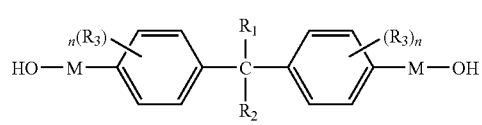
(I)

In the above formula (I), $R_1$ and $R_2$ independently represent a hydrogen atom or an alkyl group. $R_3$ represents a hydrogen atom, an alkyl group, an alkoxy group, a halogen atom or an alkoxycarbonyl group. M represents a single bond, a substituted or unsubstituted alkylene group or an oxyalkylene group. "n" represents an integer of 0 to 4.)

Preferable examples of the above-mentioned diol component (a) include 2,2-bis(4-hydroxyphenyl)propane and an alkyleneoxide adduct of 2,2-bis(4-hydroxyphenyl)propane (bisphenol A). The preferable example of the alkyleneoxide is ethyleneoxide (EO).

(b) Active Hydrogen-Containing Polysiloxane Compound

Examples of the active hydrogen-containing polysiloxane compound (b) include an active hydrogen-containing polysiloxane and/or a copolymer of said active hydrogen-containing polysiloxane and caprolactone.

Examples of the active hydrogen-containing polysiloxane include the compounds represented by the following structural formulae. These compounds are commercially available.

[Chemical Formula 3]

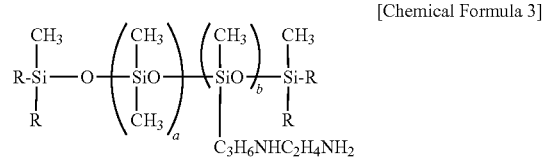

R represents a methyl group or a methoxy group.
a = 1-10 b = 2-10

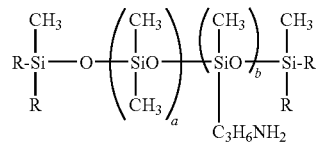

R represents a methyl group or a methoxy group.
a = 1-10 b = 2-10

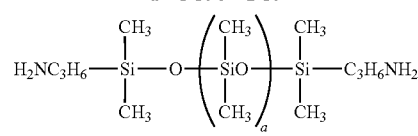

a = 0 ~ 200

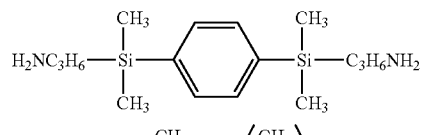

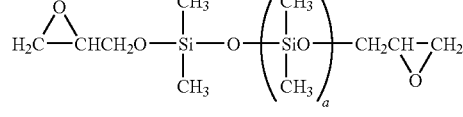

a = 1 ~ 200

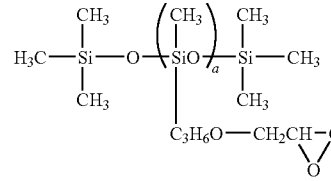

a = 1 ~ 10

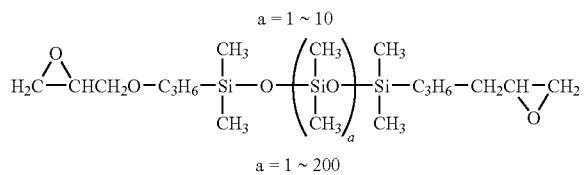

a = 1 ~ 200

-continued

[Chemical Formula 4]

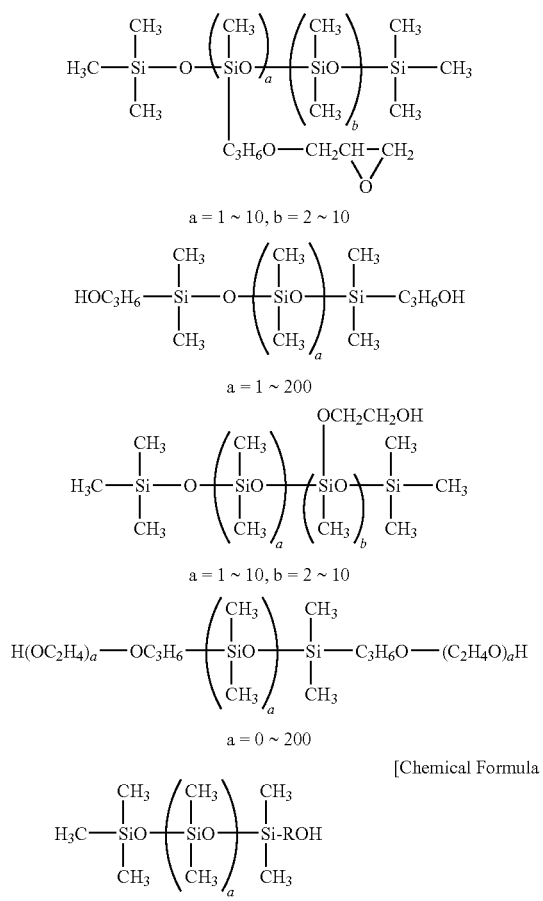

[Chemical Formula 5]

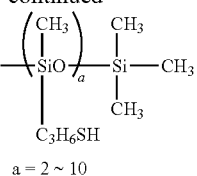

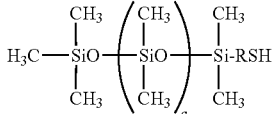

[Chemical Formula 6]

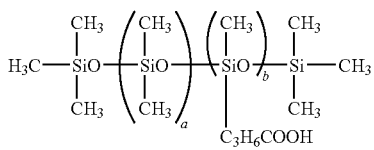

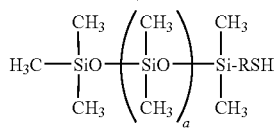

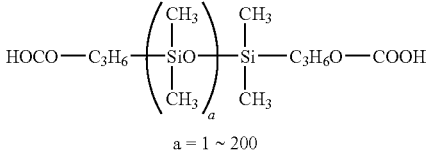

The active hydrogen-containing polysiloxanes as described above are only preferable examples of siloxane compounds for the present invention, and the present invention is not limited by these examples.

Examples of copolymers of active hydrogen-containing polysiloxane and caprolactone include a siloxane-modified polycaprolactone copolymer obtained by reacting caprolactone with the terminal hydroxy groups of the above-mentioned active hydrogen-containing polysiloxane.

Examples of caprolactones to be copolymerized with active hydrogen-containing polysiloxane include a compound represented by the following general formula (II). In the following general formula (II), R represents a hydrogen atom, an alkyl group, an alkoxy group, a cycloalkyl group, an aryl group or an aralkyl group.

[Chemical Formula 7]

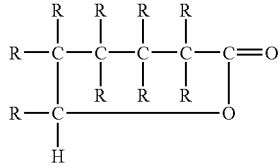

(II)

Examples of preferable caprolactones for the purpose of the present invention include various monoalkyl-ε-caprolactones such as ε-caprolactone, monomethyl-ε-caprolactone, monoethyl-ε-caprolactone, monopropyl-ε-caprolactone and monododecyl-ε-caprolactone; dialkyl-ε-caprolactones wherein both of two alkyl groups are not bonded with a carbon atom of ε-position but substituted to other similar carbon atoms respectively; trialkyl-ε-caprolactones wherein a carbon atom of ε-position in the lactone ring is not di-substituted but other 2 or 3 carbon atoms are substituted with 3 alkyl groups; alkoxy-ε-caprolactones such as ethoxy-ε-caprolactone; cycloalkyl-ε-caprolactones such as cyclohexyl-, phenyl- and benzyl-ε-caprolactone; aryl-ε-caprolactone; and aralkyl-ε-caprolactone.

The reaction of the above-mentioned active hydrogen-containing polysiloxane with caprolactone is carried out by mixing the two, preferably using an appropriate catalyst under a nitrogen stream, at a temperature of 150 to 200° C. for several hours to over 10 hours, whereby siloxane-modified polycaprolactone copolymer can be obtained.

The polyisocyanate (c) to be able to use in the present invention is diisocyanate having two isocyanate groups in one molecular. Examples of such diisocyanate include tolylene diisocyanate (TDI), diphenylmethanediisocyanate (MDI), phenylenediisocyanate, xylylenediisocyanate (XDI), tetramethyl xylylene diisocyanate (TMXDI), 1,6-hexamethylenediisocyanate (HDI), isophoronediisocyanate (IPDI), nuclearly hydrogenated MDI (H12-MDI), nuclearly hydrogenated XDI (H6-XDI), naphthalene diisocyanate (NDI) and norbornane diisocyanate (NBDI).

Among them, H12-MDI and H6-XDI are preferable for the present invention.

It is also possible to use prepolymerized diisocyanate which is obtained by reacting the above diisocyanates with diols, diamines or the like. In addition, a compound wherein a part of a diisocyanate compound is oligomerized to be a tri- or more-functional isocyanate compound can be used as far as the effect of the present invention is not impaired.

Known methods can be used for olygomerization of diisocyanate compounds. For example, isocyanuration, allophanate-formation, biuret-formation or urethanation or ureation by multifunctional alcohols or multifunctional amines Examples of the chain extender (d) to be used, if necessary, for the present invention include short-chain diols such as ethylene glycol and butane diol; polyether diols such as polyethyleneglycol, polypropyleneglycol and alkyleneoxide adducts of bisphenol compounds; polyester diols such as polyethylene adipate; polycarbonate diols; and divalent amines such as ethylenediamine. Among them, short-chain diols such as ethyleneglycol and butanediol are preferable for the present invention.

Process for producing the silicone-modified polyurethane of the present invention is not particularly limited. It can be produced by reacting the above-mentioned diol component (a), an active hydrogen-containing polysiloxane compound (b), polyisocyanate (c) and, if necessary, a chain extender (d) as the starting materials by means of a process technique of producing polyurethane commonly used.

The content of a siloxane component in the silicone-modified polyurethane is preferably 5 to 80% by weight. In case when the content is less than 5% by weight, low-surface free energy property which is the purpose of the present invention may not exhibit sufficiently. In case when the content is more than 80% by weight, the performance of polyurethane may be deteriorated and it may be difficult to make a homogeneous mixture with polycarbonate resin which would not be desirable for a resin composition for an electrophotographic photosensitive body.

The term "siloxane component" here means a siloxane unit represented by "—Si (R)$_2$O—", wherein R represents a substituted or unsubstituted alkyl group, comprised in the silicone-modified polyurethane.

The content of the silicone-modified polyurethane is 0.01 to 5 parts by weight, preferably 0.02 to 3 parts by weight based upon 100 parts by weight of the polycarbonate resin.

In addition, other lubricants such as a silicone resin, a fluorocarbon resin and polysilane can be used together in the polycarbonate resin composition of the present invention, if required, as far as the performance as an electrophotographic photosensitive body is not inhibited.

2. Electrophotographic Photosensitive Body (1) Constitution of Electrophotographic Photosensitive Body The electrophotographic photosensitive body of the present invention comprises at least a conductive support and a photosensitive layer (a photoconductive layer). In more detail, the photosensitive layer is formed on the conductive support. The photosensitive layer is formed of a material wherein a charge generating material which generates charge by exposure to light and a charge transport material which transports charge are dispersed in a binder resin.

The structure of the photosensitive layer is not particular limited. It can be of single-layer type wherein the charge generating material and the charge transport material are dispersed together in a binder resin. It can also be of multilayer type which is formed by a combination of multiple layers such as those functionally separated into a charge generating layer containing a charge generating material and a charge transport layer containing a charge transport material.

Examples of the multilayer type photosensitive layer include a photosensitive layer comprising two layers which are a charge generating layer mainly containing a charge generating material and a charge transport layer mainly containing a charge transport material. Normally, the charge generating layer is formed on a conductive support and the charge transport layer is formed on said charge generating layer.

Preferable electrophotographic photosensitive bodies for the present invention include one having a multilayer type photosensitive layer comprising two layers of a charge generating layer and a charge transport layer, and its preferable layer order is "a conductive support"/"a charge generating layer"/"a charge transport layer".

In addition, the electrophotographic photosensitive body of the present invention can have a protection layer and/or an adhesive layer if necessary. The protection layer can be formed on the surface of the photosensitive layer for the purpose of a hard coat. The adhesive layer can be formed between the conductive support and the photosensitive layer for the purpose of an excellent adhesion of the conductive support with the photosensitive layer.

(2) Conductive Support

As the conductive support for the electrophotographic photosensitive body of the present invention, a metallic material such as aluminum, stainless steel or nickel, or a polyester film, a phenol resin film or paper having an electrically conductive layer of aluminum, palladium, tin oxide, indium oxide or the like on the surface may be used.

Among them, an aluminum-metallized polyester film is particularly preferable. The thickness of the conductive support is, though not particularly limited, preferably about 20 to 100 μm.

(3) Photosensitive Layer

The electrophotographic photosensitive body of the present invention has a photosensitive layer on the conductive support. The photosensitive layer is formed of a binder resin wherein a charge generating material which generates charge by exposure to light and a charge transport material which transports charge are dispersed As a charge generating material, organic pigments of azoxybenzenes, disazo compounds, trisazo compounds, benzimidazoles, polycyclic quinolines, indigoids, quinacridones, phthalocyanines, perylenes, methines and the like can be used. These charge generating materials may be used each independently, or two or more of them can be used in combination with each other.

Examples of charge transport materials include polytetracyanoethylene; fluorenone compounds such as 2,4,7-trinitro-9-fluorenone; nitro compounds such as dinitroanthracene; succinic anhydride; maleic anhydride; dibromo maleic anhydride; triphenylmethane compounds; oxadiazole compounds such as 2,5-di(4-dimethylaminophenyl)-1,3,4-oxadiazole; styryl compounds such as 9-(4-diethylaminostyryl)anthracene; stilbene compounds such as 4-(2,2-bisphenyl-ethene-1-il)triphenylamine and 4-(2,2-bisphenyl-ethen-1-yl)-4',4''-dimethyltriphenylamine; carbazole compounds such as triphenylamine-poly(N-vinylcarbazole); pyrazoline compounds such as 1-phenyl-3-(p-dimethylaminophenyl) pyrazoline; amine derivatives such as 4,4',4''-tris(N,N-diphenylamino)triphenylamine and N,N'-bis(3-methylphenyl)-N,N'-bis(phenyl)benzidine; conjugated unsaturated compounds such as 1,1-bis(4-diethylaminophenyl)-4,4-diphenyl-1,3-butadiene, hydrazone compounds such as 4-(N,N-diethylamino)benzaldehyde-N,N-diphenylhydrazaone; nitrogen-containing cyclic compounds such as indole compounds, oxazole compounds, isooxazole compounds, thiazole compounds, thiadiazole compounds, imidazole compounds, pyrazole compounds, pyrazoline compounds and triazole compounds, and condensed polycyclic compounds. The above-listed charge transport materials can be used each independently, or two or more of them can be used in combination with each other.

(4) Binder Resin for Photosensitive Layer

In the electrophotographic photosensitive body of the present invention, it is preferable to use the above-mentioned polycarbonate resin composition of the present invention which is a blend of a polycarbonate resin and silicone-modified polyurethane as a binder resin for the photosensitive layer. Hereby, wear resistance is improved and an electrophotographic photosensitive body excellent in a service life of the photosensitive body can be obtained.

In order that the electrophotographic photosensitive body of the present invention has sufficient crack resistance and a film-forming property, it is preferable to use a polycarbonate resin having intrinsic viscosity of 1.0 to 1.6 dl/g as the polycarbonate resin for the above-mentioned polycarbonate resin composition. In case when intrinsic viscosity is less than 1.0 dl/g, the film-forming property may be deteriorated. In case when intrinsic viscosity is higher than 1.6 dl/g, crack resistance may be deteriorated. More preferably, the polycarbonate resin has intrinsic viscosity of 1.1 to 1.4 dl/g.

The above-mentioned polycarbonate resin composition can further comprise known additives such as a phenolic antioxidant, a sulfuric antioxidant, a benzotriazole ultraviolet absorbent, a benzophenone ultraviolet absorbent or the like. In that case, it is preferable to use the additives by the amount of less than 1% by weight based upon the total amount of solid contents.

In case when the photosensitive layer is of single-layer type wherein the charge generating material and the charge transport material are dispersed together in a binder resin, it is preferable to use the above-mentioned polycarbonate resin composition as said binder resin. In case when the photosensitive layer is of multilayer type separated into a charge generating layer and a charge transport layer, it is preferable to use the above-mentioned polycarbonate resin composition at least as a binder resin for the charge transport layer.

In case when the above-mentioned polycarbonate resin composition is used as a binder resin for the charge transport layer of a multilayer type photosensitive layer, examples of a binder resin for the charge generating layer include a polyvinyl butyral resin, a polyvinyl formal resin, a silicone resin, a polyamide resin, a polyester resin, a polystyrene resin, a polycarbonate resin, a polyvinyl acetate resin, a polyurethane resin, a phenoxy resin, an epoxy resin and various celluloses. Preferably, a polyvinyl butyral resin is used.

(5) Formation of a Charge Generating Layer and a Charge Transport Layer:

Regarding the case when the photosensitive layer is a multilayer type photosensitive layer comprising a charge generating layer and a charge transport layer, a method for formation of the charge generating layer and the charge transport layer will be described below.

The charge generating layer and the charge transport layer, which are a photosensitive layer, can be formed by firstly dissolving the above-mentioned charge generating material or charge transport material into a suitable solvent with a binder resin respectively, then coating the solution by means of a method such as a solution casting method, a casting method, a spray coating method, a dip coating method or the like, and drying the coating layer.

Solvents to be used here can be roughly classified into a halogen type organic solvent and a non-halogen type organic solvent.

Examples of halogen type organic solvents include dichloromethane, chloroform, monochlorobenzene, 1,1,1-trichloroethane, monochloroethane and carbon tetrachloride. Among them, it is preferable to use dichloromethane.

Examples of non-halogen type organic solvents include aromatic hydrocarbons such as toluene and xylene, ketones such as acetone, methylethylketone, cyclohexanone and isophoron, ethers such as tetrahydrofuran, 1,4-dioxane, ethylene glycol diethyl ether and ethylcellosolve, esters such as methyl acetate and ethyl acetate as well as dimethyl formamide, dimethyl sulfoxide and diethyl formamide. For the purpose of the present invention, any of the above-listed solvents can be used each independently, or two or more of them can be used in combination with each other.

When dissolving the binder resin into a solvent to form a charge transport layer, it is preferable to prepare a binder resin solution having the range of 1-20% by weight for use. It is also possible to recycle used electrophotographic photosensitive bodies commercially available by dissolving the charge transport layers of said used electrophotographic photosensitive bodies with the above-listed solvents and then forming a new charge transport layer thereon.

The mixing ratio of the charge generating material and the binder resin is preferably within a range between 10:1 and 1:20. The preferable thickness of the charge generating layer is 0.01 to 20 μm, more preferably 0.1 to 2 μm. The mixing ratio of the charge transport material and the binder resin is preferably within a range between 10:1 and 1:10. The preferable thickness of the charge transport layer is 2 to 100 μm, more preferably 5 to 40 μm.

EXAMPLES

The present invention will be described in more detail below referring to Examples. Note that the scope of the present invention is not limited by the following examples.

Examples of Synthesis 1

Synthesis of Silicone-Modified Polyurethane (PU-1)

150 parts by weight of polysiloxane having a structure represented by the following formula (III) (molecular weight; 4500) and 30 parts by weight of an ethyleneoxide adduct of bisphenol A were dissolved into 250 parts by weight of methylethylketone and 100 parts by weight of N,N-dimethylformamide.

The solution was heated to 60° C., and then 33 parts by weight of H12-MDI dissolved into 198 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-1) was obtained.

[Chemical Formula 8]

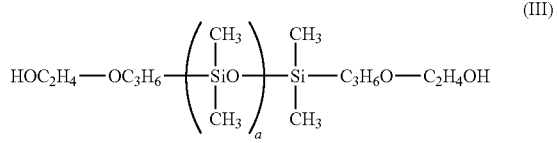

(III)

"a" represents a number bringing a molecular weight of 4500.

Examples of Synthesis 2

Synthesis of Silicone-Modified Polyurethane (PU-2)

150 parts by weight of polysiloxane having a structure represented by the following formula (IV) (molecular weight; 5200), 10 parts by weight of an ethyleneoxide adduct of bisphenol A and 12 parts by weight of 1,4-butanediol were dissolved into 250 parts by weight of methylethylketone and 100 parts by weight of N,N-dimethylformamide.

The solution was heated to 60° C., and then 52 parts by weight of H12-MDI dissolved into 198 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-2) was obtained.

[Chemical Formula 9]

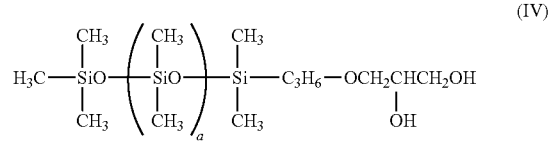

(IV)

"a" represents a number bringing a molecular weight of 5200.

Examples of Synthesis 3

Synthesis of Silicone-Modified Polyurethane (PU-3)

75 parts by weight of polysiloxane having a structure represented by the above formula (III), 75 parts by weight of polysiloxane having a structure represented by the above formula (IV), 35 parts by weight of an ethyleneoxide adduct of bisphenol A and 12 parts by weight of 1,4-butanediol were dissolved into 250 parts by weight of methylethylketone and 100 parts by weight of N,N-dimethylformamide.

The solution was heated to 60° C., and then 75 parts by weight of H12-MDI dissolved into 198 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-3) was obtained.

Examples of Synthesis 4

Synthesis of Silicone-Modified Polyurethane (PU-4)

310 parts by weight of ε-caprolactone and 0.05 parts by weight of tetrabutyltitanate were added with 150 parts by weight of polysiloxane having a structure represented by the following formula (V) (molecular weight; 980), and then the reaction was carried out at 180° C. for 10 hours under nitrogen stream, whereby polysiloxane having terminal OH having a molecular weight of 3010 (siloxane-modified polycaprolactone copolymer) was obtained.

75 parts by weight of the polysiloxane having terminal OH, 69 parts by weight of an ethyleneoxide adduct of bisphenol A and 75 parts by weight of polybutylene adipate (molecular weight 2000) were dissolved into 200 parts by weight of methylethylketone and 100 parts by weight of N,N-dimethylformamide.

The solution was heated to 60° C., and then 72 parts by weight of H12-MDI dissolved into 188 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-4) was obtained.

[Chemical Formula 10]

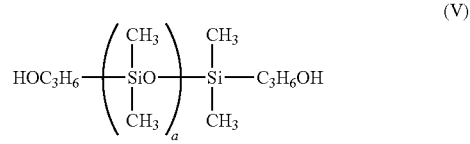

(V)

"a" represents a number bringing a molecular weight of 980.

Examples of Synthesis 5

Synthesis of Silicone-Modified Polyurethane (PU-5)

310 parts by weight of ε-caprolactone and 0.05 parts by weight of tetrabutyltitanate were added with 150 parts by weight of polysiloxane having a structure represented by the following formula (VI) (molecular weight; 1900), and then the reaction was carried out at 180° C. for 10 hours under nitrogen stream, whereby polysiloxane having terminal OH having a molecular weight of 5850 (siloxane-modified polycaprolactone copolymer) was obtained.

75 parts by weight of the polysiloxane having terminal OH, 69 parts by weight of an ethyleneoxide adduct of bisphenol A and 75 parts by weight of polybutylene adipate (molecular weight 2000) were dissolved into 200 parts by weight of methylethylketone and 100 parts by weight of N,N-dimethylformamide.

The solution was heated to 60° C., and then 93 parts by weight of H12-MDI dissolved into 188 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-5) was obtained.

[Chemical Formula 11]

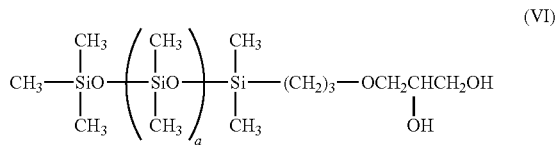

(VI)

"a" represents a number bringing a molecular weight of 1900.

Examples of Synthesis 6

Synthesis of Silicone-Modified Polyurethane (PU-6)

310 parts by weight of ε-caprolactone and 0.05 parts by weight of tetrabutyltitanate were added with 75 parts by weight of polysiloxane having a structure represented by the above formula (V) and 75 parts by weight of polysiloxane having a structure represented by the above formula (VI), and then the reaction was carried out at 180° C. for 10 hours under nitrogen stream, whereby polysiloxane having terminal OH having a molecular weight of 4416 (siloxane-modified polycaprolactone copolymer) was obtained.

75 parts by weight of the polysiloxane having terminal OH, 67 parts by weight of an ethyleneoxide adduct of bisphenol A and 75 parts by weight of polybutylene adipate (molecular weight 2000) were dissolved into 200 parts by weight of methylethylketone and 100 parts by weight of N,N-dimethylformamide.

The solution was heated to 60° C., and then 91 parts by weight of H12-MDI dissolved into 188 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-6) was obtained.

Examples of Synthesis 7

Synthesis of Silicone-Modified Polyurethane (PU-7)

310 parts by weight of ε-caprolactone and 0.05 parts by weight of tetrabutyltitanate were added with 150 parts by weight of polysiloxane having a structure represented by the above formula (V), and then the reaction was carried out at 180° C. for 10 hours under nitrogen stream, whereby polysiloxane having terminal OH having a molecular weight of 7100 (siloxane-modified polycaprolactone copolymer) was obtained.

25 parts by weight of the polysiloxane having terminal OH, 20 parts by weight of an ethyleneoxide adduct of bisphenol A and 27 parts by weight of 1,4-butanediol were dissolved into 200 parts by weight of methylethylketone and 100 parts by weight of N,N-dimethylformamide.

The solution was heated to 60° C., and then 96 parts by weight of H12-MDI dissolved into 188 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-7) was obtained.

Examples of Synthesis 8

Synthesis of Silicone-Modified Polyurethane (PU-8)

240 parts by weight of polysiloxane having a structure represented by the above formula (III) and 29 parts by weight of an ethyleneoxide adduct of bisphenol A were dissolved into 250 parts by weight of methylethylketone and 100 parts by weight of N,N-dimethylformamide.

The solution was heated to 60° C., and then 38 parts by weight of H12-MDI dissolved into 198 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-8) was obtained.

Examples of Synthesis 9

Synthesis of Silicone-Modified Polyurethane (PU-9)

150 parts by weight of polysiloxane having a structure represented by the above formula (III) and 12 parts by weight of 1,4-butanediol were dissolved into 250 parts by weight of methylethylketone and 100 parts by weight of N,N-dimethylformamide.

The solution was heated to 60° C., and then 42 parts by weight of H12-MDI dissolved into 198 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-9) was obtained.

Examples of Synthesis 10

Synthesis of Silicone-Modified Polyurethane (PU-10)

310 parts by weight of ε-caprolactone and 0.05 parts by weight of tetrabutyltitanate were added with 50 parts by weight of polysiloxane having a structure represented by the above formula (V), and then the reaction was carried out at 180° C. for 10 hours under nitrogen stream, whereby polysiloxane having terminal OH having a molecular weight of 7056 (siloxane-modified polycaprolactone copolymer) was obtained.

25 parts by weight of the polysiloxane having terminal OH, 20 parts by weight of an ethyleneoxide adduct of bisphenol A and 27 parts by weight of 1,4-butanediol were dissolved into 200 parts by weight of methylethylketone and 100 parts by weight of N,N-dimethylformamide.

The solution was heated to 60° C., and then 93 parts by weight of H12-MDI dissolved into 188 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-10) was obtained.

Examples of Synthesis 11

Synthesis of Silicone-Modified Polyurethane (PU-11)

450 parts by weight of polysiloxane having a structure represented by the above formula (III) and 20 parts by weight of an ethyleneoxide adduct of bisphenol A were dissolved into 250 parts by weight of methylethylketone and 100 parts by weight of N,N-dimethylformamide.

The solution was heated to 60° C., and then 42 parts by weight of H12-MDI dissolved into 198 parts by weight of N,N-dimethylformamide was dropped into the solution by degree while stirring. After dropping was completed, the reaction was continued at 80° C. for 6 hours. The solvent was then removed from the solution thus obtained by distillation under reduced pressure, whereby silicone-modified polyurethane in a solid state (PU-11) was obtained.

Example 1

50 parts by weight of 4-(2,2-bisphenyl-ethen-1-yl)triphenylamine manufactured by SYNTEC, tradename "ST1143", 49 parts by weight of a BPZ-type polycarbonate resin manufactured by Mitsubishi Gas Chemical Co., Inc., tradename "Iupizeta PCZ-400" and 1 part by weight (that is, 2 parts by weight based upon 100 parts by weight of the polycarbonate resin) of silicone-modified polyurethane (PU-1) obtained by the above-mentioned example of synthesis 1 were dissolved into 300 parts by weight of tetrahydrofuran and 50 parts by weight of toluene, whereby a coating solution was prepared.

The above coating solution was coated by means of a dip coating method onto a commercially available LBP photosensitive body manufactured by Seiko Epson Corp., tradename "LPA3ETC4", from which the charge transport layer had been removed in advance by tetrahydrofuran. Then, the coated solution was dried in flowing air and then left for drying at 100° C. for 8 hours to form an about 20 μm-thick charge transport layer, whereby a multilayer electrophotographic photosensitive body (hereinafter, "OPC") was prepared.

A wet tension test of the surface of the OPC was carried out in reference to JIS-K6768.

Standard solutions for respective surface tensions were prepared using methanol, water, ethyleneglycol monoethylether and formaldehyde. The standard solution was extended rapidly onto the above-mentioned OPC, and after 2 seconds, its surface was observed to examine whether it was wet or not.

The following solutions were used for the test: 22.6 mN/m (100% methanol), 27.3 mN/m (80 vol % of methanol, 20 vol % of water), 30 mN/m (100 vol % ethyleneglycol monoethylether), 40 mN/m (36.5 vol % of ethyleneglycol monoethylether, 63.5 vol % of formaldehyde) and 50 mN/m (9.3 vol % of ethyleneglycol monoethylether, 90.7 vol % of formaldehyde).

The above-prepared OPC was mounted in a commercially available LBP (tradename "LBP-8400": manufactured by Seiko Epson Corp.) and the LBP was driven continuously to print an entirely black solid image on 20,000 sheets of paper. Thereafter, wear amount of the photosensitive body and printed images were observed. The results were shown in Table 1. In Table 1, "PCZ-400" represents a BPZ-type homopolycarbonate resin and "FPC-2136" represents BPA/BPC copolymer-type polycarbonate resin.

Example 2

Experiment was carried out in the same manner as Example 1 except that 1 part by weight (that is, 2 parts by weight based upon 100 parts by weight of the polycarbonate resin) of PU-2 was added in place of PU-1.

Example 3

Experiment was carried out in the same manner as Example 1 except that 1 part by weight (that is, 2 parts by weight based upon 100 parts by weight of the polycarbonate resin) of PU-3 was added in place of PU-1.

Example 4

Experiment was carried out in the same manner as Example 1 except that 1 part by weight (that is, 2 parts by weight based upon 100 parts by weight of the polycarbonate resin) of PU-4 was added in place of PU-1.

Example 5

Experiment was carried out in the same manner as Example 1 except that 1 part by weight (that is, 2 parts by weight based upon 100 parts by weight of the polycarbonate resin) of PU-5 was added in place of PU-1.

Example 6

Experiment was carried out in the same manner as Example 1 except that 1 part by weight (that is, 2 parts by weight based upon 100 parts by weight of the polycarbonate resin) of PU-6 was added in place of PU-1.

Example 7

Experiment was carried out in the same manner as Example 1 except that 1 part by weight (that is, 2 parts by weight based upon 100 parts by weight of the polycarbonate resin) of PU-7 was added in place of PU-1.

Example 8

Experiment was carried out in the same manner as Example 1 except that 1 part by weight (that is, 2 parts by weight based upon 100 parts by weight of the polycarbonate resin) of PU-8 was added in place of PU-1.

Example 9

Experiment was carried out in the same manner as Example 1 except that 49 parts by weight of commercially available BPA/BPC copolymer-type polycarbonate resin manufactured by Mitsubishi Gas Chemical Co., tradename "Iupizeta FPC-2136", was used in place of PCZ-400.

Example 10

Experiment was carried out in the same manner as Example 4 except that 0.005 parts by weight (that is, 0.01 parts by weight based upon 100 parts by weight of the polycarbonate resin) of PU-4 was added.

Example 11

Experiment was carried out in the same manner as Example 4 except that 2.5 parts by weight (that is, 5 parts by weight based upon 100 parts by weight of the polycarbonate resin) of PU-4 was added.

Comparative Example 1

Experiment was carried out in the same manner as Example 1 except that PU-1 was not used and the amount of PCZ-400 was increased to 50 parts by weight.

Comparative Example 2

Experiment was carried out in the same manner as Example 1 except that 1 part by weight (that is, 2 parts by weight based upon 100 parts by weight of the polycarbonate resin) of PU-9 was added in place of PU-1.

Comparative Example 3

Experiment was carried out in the same manner as Example 1 except that 1 part by weight (that is, 2 parts by weight based upon 100 parts by weight of the polycarbonate resin) of PU-10 was added in place of PU-1.

Comparative Example 4

Experiment was carried out in the same manner as Example 1 except that 1 part by weight (that is, 2 parts by weight based upon 100 parts by weight of the polycarbonate resin) of PU-11 was added in place of PU-1.

Comparative Example 5

Experiment was carried out in the same manner as Example 1 except that 0.0025 parts by weight (that is, 0.005 parts by weight based upon 100 parts by weight of the polycarbonate resin) of PU-1 was added.

Comparative Example 6

Experiment was carried out in the same manner as Example 4 except that 5 parts by weight (that is, 10 parts by weight based upon 100 parts by weight of the polycarbonate resin) of PU-4 was added.

INDUSTRIAL APPLICABILITY

The polycarbonate resin composition of the present invention is a resin material excellent in wear resistance and crack resistance, and when it is used as a binder resin for a photosensitive layer (in case when the photosensitive layer is of multilayer type, for a charge transport layer) of an electrophotographic photosensitive body, wear resistance can be improved while maintaining electrification characteristic of the electrophotographic photosensitive body. Therefore, surface abrasion at the time of repeated uses is suppressed and an electrophotographic photosensitive body excellent in a service life of the photosensitive body can be obtained.

What is claimed is:

1. A polycarbonate resin composition, comprising:
   (A) 100 parts by weight of a polycarbonate resin, and
   (B) 0.01-5 parts by weight of a silicone-modified polyurethane obtained by reacting a diol component (a) represented by the following formula (I), an active hydrogen-containing polysiloxane compound (b), a polyisocyanate component (c) and optionally a chain extender (d)

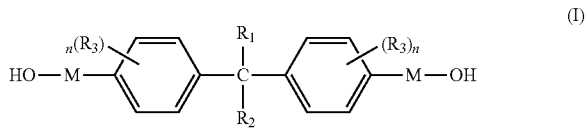

wherein, in formula (I), $R_1$ and $R_2$ independently represent a hydrogen atom or an alkyl group, $R_3$ represents a hydrogen atom, an alkyl group, an alkoxy group, a halogen atom or an alkoxycarbonyl group, M represents a single bond, a substituted or unsubstituted alkylene group or an oxyalkylene group, and n represents an integer of 0 to 4.

2. The polycarbonate resin composition according to claim 1, wherein the active hydrogen-containing polysiloxane compound (b) is a compound selected from the group consisting of active hydrogen-containing polysiloxane and a copolymer of active hydrogen-containing polysiloxane and caprolactone.

3. The polycarbonate resin composition according to claim 1, wherein the silicone-modified polyurethane has a siloxane component content of 5 to 80% by weight.

TABLE 1

| | PC | Polyurethane (Content based upon PC) | Wet Tension (mN/m) | Wear Amount (mg) | Image Defects |
|---|---|---|---|---|---|
| Example 1 | PCZ-400 | PU-1(2 parts by weight) | 27.3-30 | 34 | Not observed |
| Example 2 | PCZ-400 | PU-2(2 parts by weight) | 22.6-27.3 | 26 | Not observed |
| Example 3 | PCZ-400 | PU-3(2 parts by weight) | 22.6-27.3 | 32 | Not observed |
| Example 4 | PCZ-400 | PU-4(2 parts by weight) | 22.6-27.3 | 33 | Not observed |
| Example 5 | PCZ-400 | PU-5(2 parts by weight) | 22.6-27.3 | 30 | Not observed |
| Example 6 | PCZ-400 | PU-6(2 parts by weight) | 27.3-30 | 30 | Not observed |
| Example 7 | PCZ-400 | PU-7(2 parts by weight) | 22.6-27.3 | 39 | Not observed |
| Example 8 | PCZ-400 | PU-8(2 parts by weight) | 22.6-27.3 | 34 | Not observed |
| Example 9 | FPC-2136 | PU-1(2 parts by weight) | 27.3-30 | 36 | Not observed |
| Example 10 | PCZ-400 | PU-4(0.01 parts by weight) | 22.6-27.3 | 40 | Not observed |
| Example 11 | PCZ-400 | PU-4(5 parts by weight) | −22.6 | 25 | Not observed |
| Comp. Example 1 | PCZ-400 | — | 40-50 | 121 | Not observed |
| Comp. Example 2 | PCZ-400 | PU-9(2 parts by weight) | 22.6-27.3 | 35 | Observed |
| Comp. Example 3 | PCZ-400 | PU-10(2 parts by weight) | 30-40 | 83 | Not observed |
| Comp. Example 4 | PCZ-400 | PU-11(2 parts by weight) | Not be able to coat on OPC in good condition | | |
| Comp. Example 5 | PCZ-400 | PU-1(0.005 parts by weight) | 40-50 | 98 | Not observed |
| Comp. Example 6 | PCZ-400 | PU-4(10 parts by weight) | Incompatible with PC | | |

4. The polycarbonate resin composition according to claim 1, wherein the diol component (a) represented by the formula (I) is 2,2-bis(4-hydroxyphenyl)propane or an alkyleneoxide adduct of 2,2-bis(4-hydroxyphenyl)propane.

5. The polycarbonate resin composition according to claim 1, wherein the polycarbonate resin is obtained from at least one bisphenol starting material selected from the group consisting of 1,1'-biphenyl-4,4'-diol, 2,2-bis(4-hydroxyphenyl)propane, 1,1-bis(4-hydroxyphenyl)cyclohexane and 2,2-bis(4-hydroxy-3-methylphenyl)propane.

6. The polycarbonate resin composition according to claim 1, wherein the polycarbonate resin has an intrinsic viscosity of 1.0 to 1.6 dl/g.

7. The polycarbonate resin composition according to claim 1, which is a binder resin in a photosensitive layer of an electrophotographic photosensitive body comprising at least a conductive support and a photosensitive layer.

8. The polycarbonate resin composition according to claim 1, which is a binder resin in a charge transport layer of an electrophotographic photosensitive body comprising at least a conductive support and a multilayer photosensitive layer separated into a charge generating layer and a charge transport layer.

9. An electrophotographic photosensitive body comprising at least a conductive support and a photosensitive layer, wherein the photosensitive layer comprises the polycarbonate resin composition according to claim 1 as a binder resin.

10. An electrophotographic photosensitive body comprising at least a conductive support and a multilayer photosensitive layer separated into a charge generating layer and a charge transport layer, wherein the charge transport layer comprises the polycarbonate resin composition according to claim 1 as a binder resin.

11. An electrophotographic photosensitive body comprising at least a conductive support and a photosensitive layer, wherein the photosensitive layer comprises the polycarbonate resin composition according to claim 2 as a binder resin.

12. An electrophotographic photosensitive body comprising at least a conductive support and a photosensitive layer, wherein the photosensitive layer comprises the polycarbonate resin composition according to claim 3 as a binder resin.

13. An electrophotographic photosensitive body comprising at least a conductive support and a photosensitive layer, wherein the photosensitive layer comprises the polycarbonate resin composition according to claim 4 as a binder resin.

14. An electrophotographic photosensitive body comprising at least a conductive support and a photosensitive layer, wherein the photosensitive layer comprises the polycarbonate resin composition according to claim 5 as a binder resin.

15. An electrophotographic photosensitive body comprising at least a conductive support and a photosensitive layer, wherein the photosensitive layer comprises the polycarbonate resin composition according to claim 6 as a binder resin.

16. An electrophotographic photosensitive body comprising at least a conductive support and a multilayer photosensitive layer separated into a charge generating layer and a charge transport layer, wherein the charge transport layer comprises the polycarbonate resin composition according to claim 2 as a binder resin.

17. An electrophotographic photosensitive body comprising at least a conductive support and a multilayer photosensitive layer separated into a charge generating layer and a charge transport layer, wherein the charge transport layer comprises the polycarbonate resin composition according to claim 3 as a binder resin.

18. An electrophotographic photosensitive body comprising at least a conductive support and a multilayer photosensitive layer separated into a charge generating layer and a charge transport layer, wherein the charge transport layer comprises the polycarbonate resin composition according to claim 4 as a binder resin.

19. An electrophotographic photosensitive body comprising at least a conductive support and a multilayer photosensitive layer separated into a charge generating layer and a charge transport layer, wherein the charge transport layer comprises the polycarbonate resin composition according to claim 5 as a binder resin.

20. An electrophotographic photosensitive body comprising at least a conductive support and a multilayer photosensitive layer separated into a charge generating layer and a charge transport layer, wherein the charge transport layer comprises the polycarbonate resin composition according to claim 6 as a binder resin.

* * * * *